United States Patent
Le et al.

(10) Patent No.: US 6,424,570 B1
(45) Date of Patent: Jul. 23, 2002

(54) MODULATED CHARGE PUMP WITH USES AN ANALOG TO DIGITAL CONVERTER TO COMPENSATE FOR SUPPLY VOLTAGE VARIATIONS

(75) Inventors: Binh Q. Le, San Jose; Pau-Ling Chen, Saratoga, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/892,189

(22) Filed: Jun. 26, 2001

(51) Int. Cl.[7] ................................................ G11C 16/04

(52) U.S. Cl. .................................... 365/185.18; 365/226

(58) Field of Search ............................ 365/185.18, 226, 365/185.33; 327/536, 538

(56) References Cited

U.S. PATENT DOCUMENTS 5,532,653 A * 7/1996 Adkins ........................ 331/143
5,880,622 A * 3/1999 Evertt ......................... 327/535
5,973,546 A   10/1999 Le et al.

OTHER PUBLICATIONS 5,612,921, 03/1997, Chang et al. (withdrawn)

* cited by examiner

Primary Examiner—A. Zarabian
(74) Attorney, Agent, or Firm—Eschweiler & Associates, LLC (57) ABSTRACT

A system is described for generating a charge pump voltage for flash memory operations, wherein a supply voltage detection circuit (e.g., analog to digital converter, digital thermometer) is configured to detect a supply voltage value and generate one or more supply voltage level detection signals associated therewith. The system further includes a charge pump circuit comprising one or more stages operable to receive a supply voltage and generate the charge pump output voltage having a value greater than the supply voltage, and a charge pump compensation circuit operably coupled to the supply voltage detection circuit and the charge pump circuit. The charge pump compensation circuit is operable to receive the one or more output signals from the supply voltage detection circuit and modulate a capacitive loading associated with the charge pump circuit based on the one or more output signals, thereby creating an improved low power charge pump which uses a modulated pumping capacitance to compensate for fluctuations of the input power supply (for example, $V_{CC}$), to produce a slow ripple and low noise output which may be used as a pumped voltage for various mode operations (e.g., erase, program modes) of memory cells.

14 Claims, 6 Drawing Sheets

MODULATED CHARGE PUMP WITH USES AN ANALOG TO DIGITAL CONVERTER TO COMPENSATE FOR SUPPLY VOLTAGE VARIATIONS

FIELD OF INVENTION

The present invention relates generally to memory systems and in particular, to flash memory array systems and methods for producing a charge pump circuit, wherein a voltage detection circuit (e.g., analog to digital converter, digital thermometer), may be used to measure the $V_{CC}$ applied to the charge pump circuit, along with variable pumping capacitance network compensation circuitry to conserve power, and to reduce the ripple and noise in the output voltage. The modulated charge pump voltage may be applied to a wordline or bitline, for example, for program or erase mode operations of memory cells.

BACKGROUND OF THE INVENTION

Flash and other types of electronic memory devices are constructed of thousands or millions of memory cells, adapted to individually store and provide access to data. A typical memory cell stores a single binary piece of information referred to as a bit, which has one of two possible states. The cells are commonly organized into multiple cell units such as bytes which comprise eight cells, and words which may include sixteen or more such cells, usually configured in multiples of eight. Storage of data in such memory device architectures is performed by writing to a particular set of memory cells, sometimes referred to as programming the cells. Retrieval of data from the cells is accomplished in a read operation. In addition to programming and read operations, groups of cells in a memory device may be erased, wherein each cell in the group is programmed to a known state.

The individual cells are organized into individually addressable units or groups such as bytes or words, which are accessed for read or program operations through address decoding circuitry, whereby such operations may be performed on the cells within a specific byte or word. The individual memory cells are typically comprised of a semiconductor structure adapted for storing a bit of data. For instance, many conventional memory cells include a metal oxide semiconductor (MOS) device, such as a transistor in which a binary piece of information may be retained. The memory device includes appropriate decoding and group selection circuitry to address such bytes or words, as well as circuitry to provide voltages to the cells being operated on in order to achieve the desired operation.

The erase, program, and read operations are commonly performed by application of appropriate voltages to certain terminals of the cell MOS device. In an erase or program operation the voltages are applied so as to cause a charge to be stored in the memory cell. In a read operation, appropriate voltages are applied so as to cause a current to flow in the cell, wherein the amount of such current is indicative of the value of the data stored in the cell. The memory device includes appropriate circuitry to sense the resulting cell current in order to determine the data stored therein, which is then provided to data bus terminals of the device for access to other devices in a system in which the memory device is employed.

For a read operation, a certain voltage bias is applied across the drain and source of the cell transistor. The drain of the cell is coupled to the bitline, which may be connected to the drains of other cells in a byte or word group. The voltage at the drain in conventional stacked gate memory cells is typically provided at between about 0.5 and 1.0 volts in a read operation. A voltage is then applied to the gate (e.g., via the respective wordline) of the memory cell transistor in order to cause a current to flow from the drain to source. The read operation gate voltage is typically applied at a level between a programmed cell threshold voltage ($V_T$) and an unprogrammed cell threshold voltage. The resulting current is measured, by which a determination is made as to the data value stored in the cell.

More recently, dual bit flash memory cells have been introduced, which allow the storage of two bits of information in a single memory cell. The bitline (drain), and wordline (gate) voltages required for dual bit memory cells is typically higher than that of single bit, stacked gate architecture memory cells, due to the physical construction of the dual bit cell.

In these semiconductor applications, a charge pump sometimes is used to increase a small input, or supply voltage (for example, $V_{CC}$) to a larger voltage that is passed to the word lines or bit lines of the semiconductor memory devices. For example, some dual bit memory cell architectures require about 9.5 volts to properly bias the word lines, about 6 volts for the bitline or drain of such cells, and between −6 to −8 volts for negative erase voltages, for the various memory operations discussed. These voltages which are all higher than the applied supply voltage, are all created and fed by charge pumps to increase the supply voltage to the output voltage desired. These voltages affect the reading and writing of data from/to the memory device. The voltage is increased by channeling the relatively small input voltage through a series of stages. The more stages a charge pump has, the greater the resulting output voltage.

Because these charge pump voltages applied to the memory cell are derived from the memory device supply voltage ($V_{CC}$), the ability to provide the higher voltage required for the newer dual bit memory cells may be impaired when the supply voltage is at or near lower rated levels. In addition, low power applications for memory devices, such as cellular telephones, laptop computers, and the like, may further reduce the supply voltage available.

Currently, conventional charge pumps are constructed using several bootstrap capacitors having the same capacitance C at each respective node of the charge pump. A bootstrap capacitor is defined as the capacitor connected to each respective node of a charge pump. As the required voltages for applications increases, the number of stages necessary to generate the higher output voltages also increases. However, as the number of stages is increased, the efficiency of the charge pump has been found to decrease.

Figure 1:
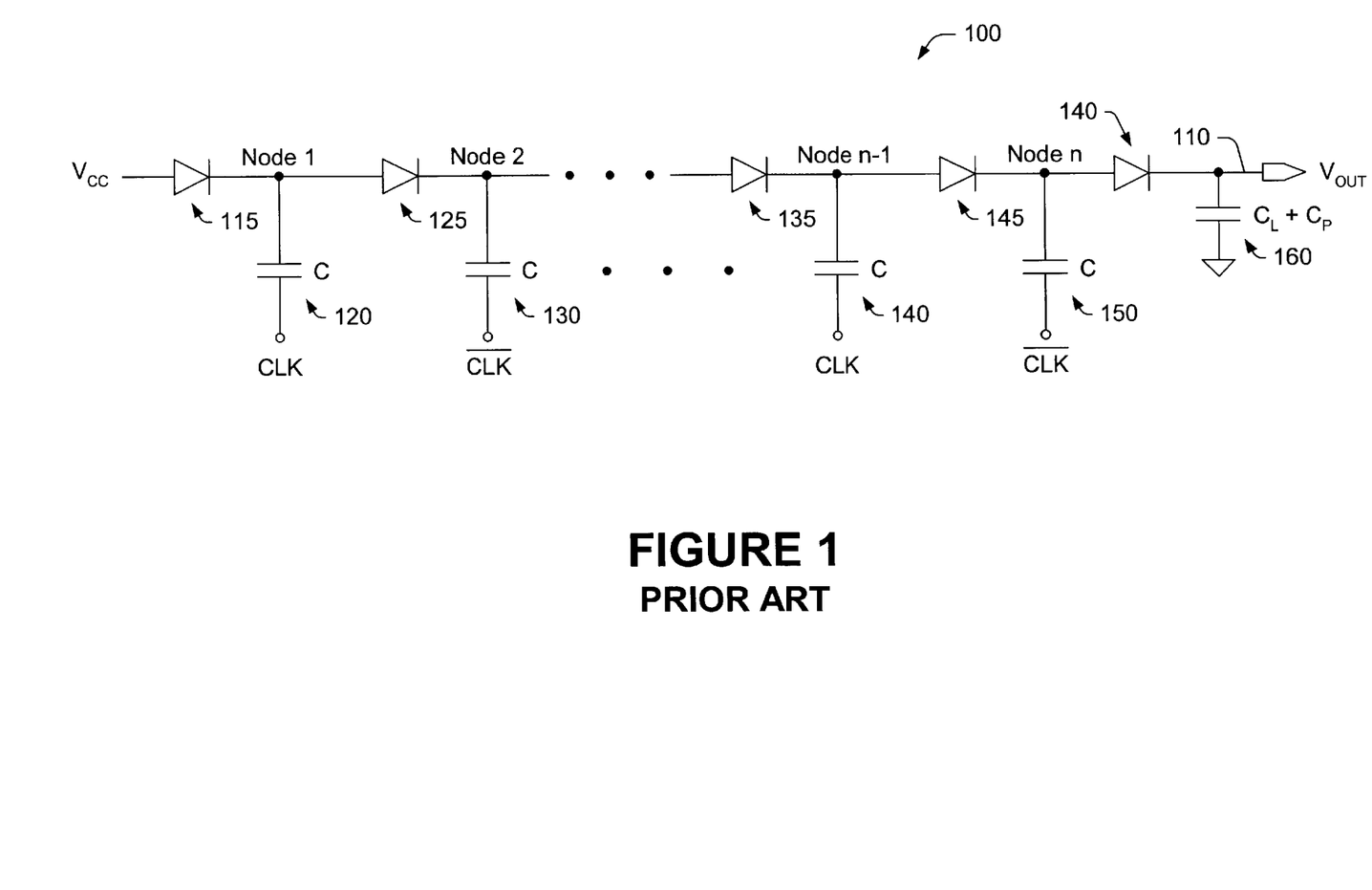
FIG. 1 illustrates a conventional charge pump architecture.

FIG. 1 provides an illustration of a conventional charge pump. As shown, the conventional charge pump 100 has a number of stages (stage 1 thru stage n). The charge pump 100 has at its input, a voltage, $V_{CC}$ which is transmitted through a diode 115 to a first node (node 1) including a first bootstrap capacitor 120 having a capacitance C. A second node (node 2) is connected to the first node (node 1) via a diode 125 and also has a second bootstrap capacitor 130 having a capacitance C. The output of node 2 is then passed through a number of subsequent nodes, identical to previously described nodes 1 and 2, that also include a bootstrap capacitor having a capacitance value C that is substantially identical to the capacitance value C present at nodes 1 and 2. Finally, the conventional charge pump has an output terminal, $V_{OUT}$, also having a capacitor 160 having a total capacitance $C_{L+P}$ which is defined as being the load capacitance $C_L$ of the load connected to the output of the pump and a parasitic capacitance $C_P$ inherent in the transmitting means of the conventional pump. As stated above, the bootstrap capacitance of the various nodes of circuit 100 in prior art FIG. 1 all have value C.

Figure 2:
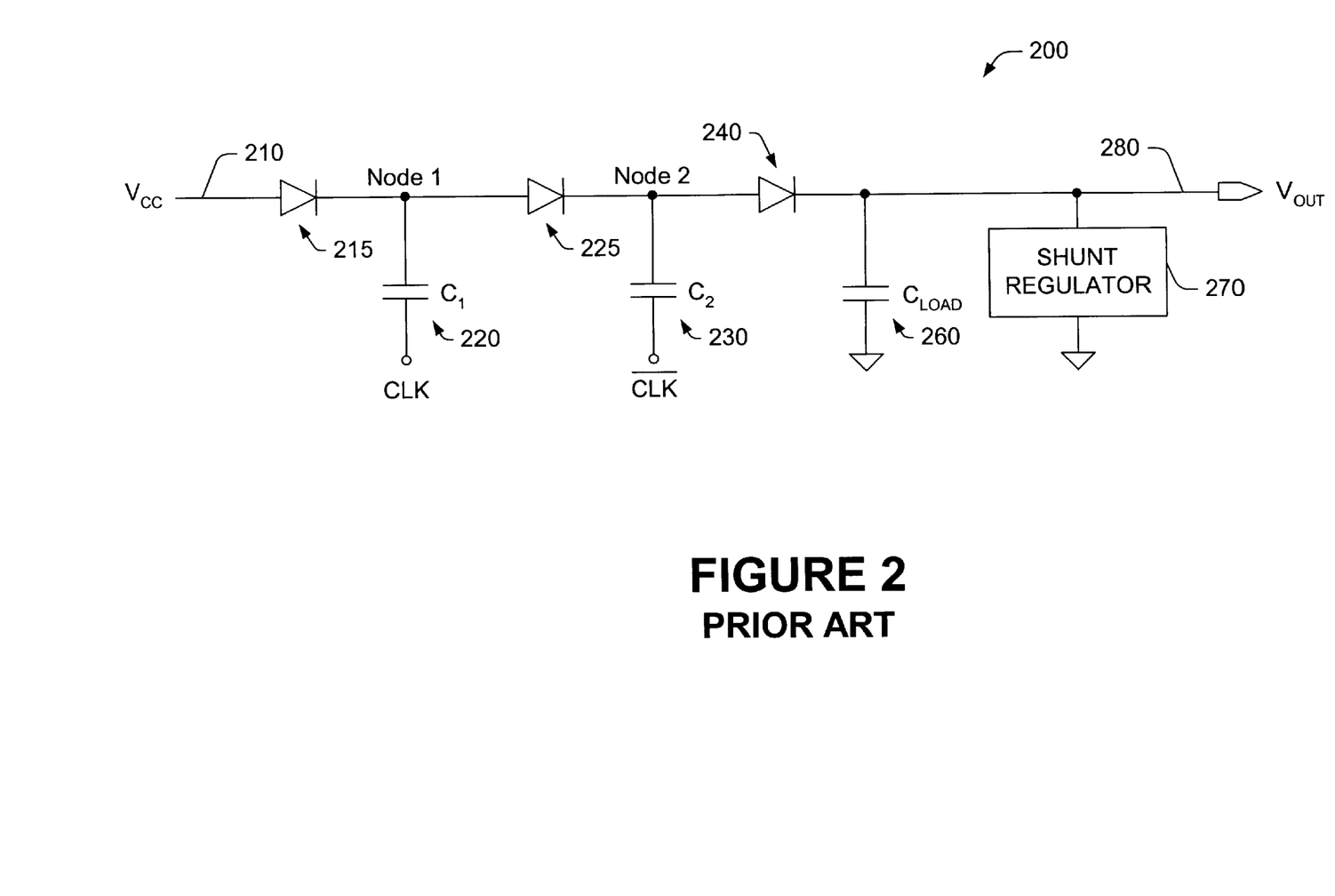
FIG. 2 illustrates a conventional charge pump using a shunt regulator to regulate the output voltage.

In the prior art example of FIG. 2, a conventional two stage charge pump 200 is illustrated with large capacitor values to accommodate the lowest power supply level, and the addition of a shunt regulator 270 attached at the conventional point of the charge pump output 280, to reduce the output when the supply or the output voltage is higher than a target value. As in FIG. 1, the charge pump 200 of FIG. 2 includes an input 210 coupled to an input voltage such as the supply voltage $V_{CC}$. The input 210 is coupled to a first stage, via a diode 215, which is also coupled to a first stage node (node 1) including a capacitor 220 having a capacitance $C_1$.

The first stage is further connected to a second stage, via a diode element 225, including a second and final stage node (node 2) having a bootstrap capacitor 230 having a capacitance $C_2$. The final stage node (node 2) is coupled through a diode 240 to a load capacitor 260 having a capacitance value $C_{LOAD}$, and to the shunt regulator 270. The shunt regulator 270 produces a regulated version of the charge pump output $V_{OUT}$ 280.

Also connected to each stage of the charge pumps of FIGS. 1 and 2, are non-overlapping clock phase inputs CLK and CLK NOT, which oscillate from 0 to $V_{CC}$. The clock phase inputs insure that adjacent charge pump nodes are either being charged by a previous node or is charging a subsequent node.

The shunt regulator 280 regulates the charge pump output by partially shorting to ground that portion of the charge pump output which is greater than a desired voltage level. In this conventional method, large capacitor values may be used to compensate for the lowest power supply voltage. However, when the $V_{CC}$ is not at its lowest level, the use of large capacitor values wastes power supply charge which may be simply shorted to ground through the shunt regulator, resulting in an overall loss of pump efficiency.

The output of the charge pump 280 and the shunt regulator 270 experience a ripple voltage signal from the charge and discharge cycles, with a period which matches the clock cycle period. The ripple voltage level on the output rises during a charge cycle, and drops again as a function of the RC discharge of the load and the load capacitance $C_{LOAD}$ 260. The ripple voltage level rises during the charge cycle, until the shunt regulator determines that an over-voltage condition or target regulation voltage has been reached, wherein the shunt regulator shunting transistors begin to conduct and shunt the over-voltage charge to ground. Because of the internal regulation feedback and response time delays within the shunt regulator, the shunting transistors will not be able to react immediately to the over-voltage level, thereby causing the charge pump voltage to continue to rise beyond the target regulation voltage before the shunting transistors can respond with adequate conduction. Given the typical feedback-response delay of the shunt regulator 270, the conventional charge pump 200 will produce an increased ripple magnitude (e.g., about 400 mV P-P ripple at about 9 volt output) at the output 280 when the input supply voltage 210 is high.

Additionally, noise spikes and valleys are produced on the output 280 as the shunting transistors in the shunt regulator 270 discharge the over-voltage on the charge pump capacitors to ground. Thus, greater supply levels result in higher charge pump output voltage peaks, which result in larger noise spikes and valleys at the regulator output 280, increased power consumption and reduced overall system efficiency.

In a prior art flash memory device, charge pump circuits apply a pumped voltage, for example, to the wordline for program mode operations of memory cells. $V_{CC}$ variations are typically reflected in the output of the charge pump circuit in terms of increased ripple and noise. In addition, at high $V_{CC}$ voltages, the charge pump circuit and shunt regulator circuit together as a system exhibit increased power consumption and reduced system efficiency. Additionally, most device applications seek to consume a minimum of power from the supply, particularly in battery and other portable power device applications this is important. Accordingly, there is a need for a low power, low noise means of compensation for the variations in the $V_{CC}$ supply applied to the charge pump circuit, while maintaining a simple regulator design.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention, Its primary purpose is to present some concepts of the invention in a simplified form as a prelude to the more detailed description that is presented later.

The invention is directed to a novel charge pump circuit where one or more individual stages of the charge pump is characterized by having a variable bootstrap capacitance value which is varied as a function of the input supply voltage.

In the present invention of flash memory array systems and methods for producing a charge pump circuit, the application of a voltage detection circuit (e.g., analog to digital converter, digital thermometer) may be used to measure the value of $V_{CC}$ applied to a charge pump circuit which may be used to generate a charge pump voltage for various operations of memory cells. $V_{CC}$ variations are typically reflected in the output of the charge pump circuit which is supplied to a charge pump regulator which is then supplied to the wordline or bitline of the flash memory array. By compensating for the variations in the $V_{CC}$ supply applied to the charge pump circuit, power consumption is reduced, and the output voltage and peak-to-peak noise variations are limited, thereby enabling a more efficient, low power voltage for the wordlines or bitlines. These features are provided by a charge pump including an input means for providing an input voltage, an output means for delivering an output voltage which is a boosted function of the input voltage, and multiple stage means, connected between the input and output means which generate the modified signal. The multiple stage means also include a plurality of capacitance means, wherein each respective one of the capacitance means has a value which may be varied as a function of the input voltage.

An advantage of the present invention is the ability of the charge pump and shunt regulator system to produce a lower noise output, as compared to conventional charge pump and regulator systems without compensation. In the conventional system, a high input supply level produces a bigger over-voltage on the output of the charge pump. Large noise spikes and valleys are produced at the shunt regulator output at high supply voltage conditions.

A feature of the charge pump of the present invention is that it requires less power than conventional charge pumps, as only the capacitors which are needed to maintain the desired output voltage are charged as a function of the input supply voltage, thereby substantially less power is utilized in the output charge pump regulator.

Another feature of the charge pump of the present invention is that it is more efficient than conventional charge pumps, in that the total power required to produce a desired output voltage is minimized by the ability to vary the capacitance of the bootstrap capacitor values within the stages which are varied as a function of the input supply voltage.

According to one aspect of the present invention, a voltage value associated with the $V_{CC}$ supply voltage is ascertained, for example, using an A/D converter. The determined voltage value is then used to compensate or otherwise adjust a variable bootstrap capacitor network capacitance value associated with one or more stages of a charge pump circuit. For example, a digital word representing the detected $V_{CC}$ voltage value is used to vary effective capacitance values within the capacitor networks of the charge pump circuit. Consequently, the present invention provides a low power, efficient, low noise charge pump output voltage, for example, a charge pumped wordline or bitline voltage, which facilitates an accurate operation of flash memory cells despite fluctuations in the $V_{CC}$ supply voltage.

The aspects of the invention find application in devices which include dual bit memory cells requiring higher bitline and wordline voltages than single bit cells, and in association with memory devices employed in varying supply voltage and low power applications.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with reference to the drawings, wherein like reference numerals are used to refer to like elements throughout. The present invention relates to a flash memory array circuit for producing an improved low power charge pump which uses a modulated pumping capacitance to compensate for fluctuations of the input power supply (for example, $V_{CC}$), to produce a low ripple and low noise output which may be used as a pumped voltage for various mode operations (e.g., erase, program modes) of memory cells. The present invention comprises a charge pump circuit architecture wherein one or more stages of the charge pump exhibits a variable bootstrap capacitance which varies as a function of the input supply voltage to produce an output voltage which is greater than the supply voltage, and which consumes substantially less power from the input power supply.

The $V_{CC}$ power supply is applied to the charge pump circuit to supply input power for the charge pump operation. $V_{CC}$ variations which are typically reflected in the output of the conventional charge pump circuit are identified, and compensation for such variations are generated to thereby generate wordline or bitline voltages during various flash memory cell modes. Consequently, a shunt regulator circuit which may operate in conjunction with such a charge pump circuit will consume less power and regulate the charge pump output with less ripple than with conventional charge pump circuits.

According to an exemplary aspect of the present invention, the system incorporates a voltage detection circuit (e.g., analog to digital converter, digital thermometer), which is used to measure the $V_{CC}$ applied to the charge pump circuit. The detected $V_{CC}$ value is then employed in a compensation circuit to vary a manner in which the charge pump circuit output voltage is generated. By compensating for these variations in the $V_{CC}$ supply which is applied to the charge pump circuit, the charge pump output voltage is modulated, enabling a more stable, for example, wordline or bitline voltage. This allows proper mode operations with respect to the memory cell of interest in the flash memory, even where the supply voltage varies.

In one exemplary compensation methodology of the present invention, the supply voltage detection circuit (e.g., analog to digital converter, digital thermometer) is used to measure the supply voltage $V_{CC}$ and output a quantity of "n" comparison results relative to a reference voltage $FV_{REF}$. Each comparison result yields an amount of compensation correction to the charge pump circuit via a charge pump compensation circuit. When the $V_{CC}$ sample is taken and a certain number of comparison outputs are turned on, a corresponding number of bootstrap capacitors are added to one or more stages of the compensation circuits in relation to the value of the detected input supply voltage $V_{CC}$. The amount of compensation provided to the charge pump circuit output $V_{OUT}$ is therefore modulated as a function of the $V_{CC}$ in an iterative fashion based on the number of voltage detection and corresponding compensation elements desired. The resolution of the compensation desired may be adjusted to fit the specific requirements of the charge pump output voltage usage, for example, by increasing the A/D converter from an 8 bit to a 16 bit A/D converter.

In another aspect of the invention, the voltage detection elements themselves, may also be weighted (e.g., evenly, binarily, exponentially), or weighted in any other suitable fashion across the range of voltage detection, along with a weighting of their respective charge pump compensation circuit capacitances as may be desired.

In still another aspect of the invention, the compensation circuit elements may be any combination of circuit architecture which exhibits capacitance (e.g., transistor junction, or capacitors) which are operable to be varied by the supply voltage detection circuit.

Figure 3:
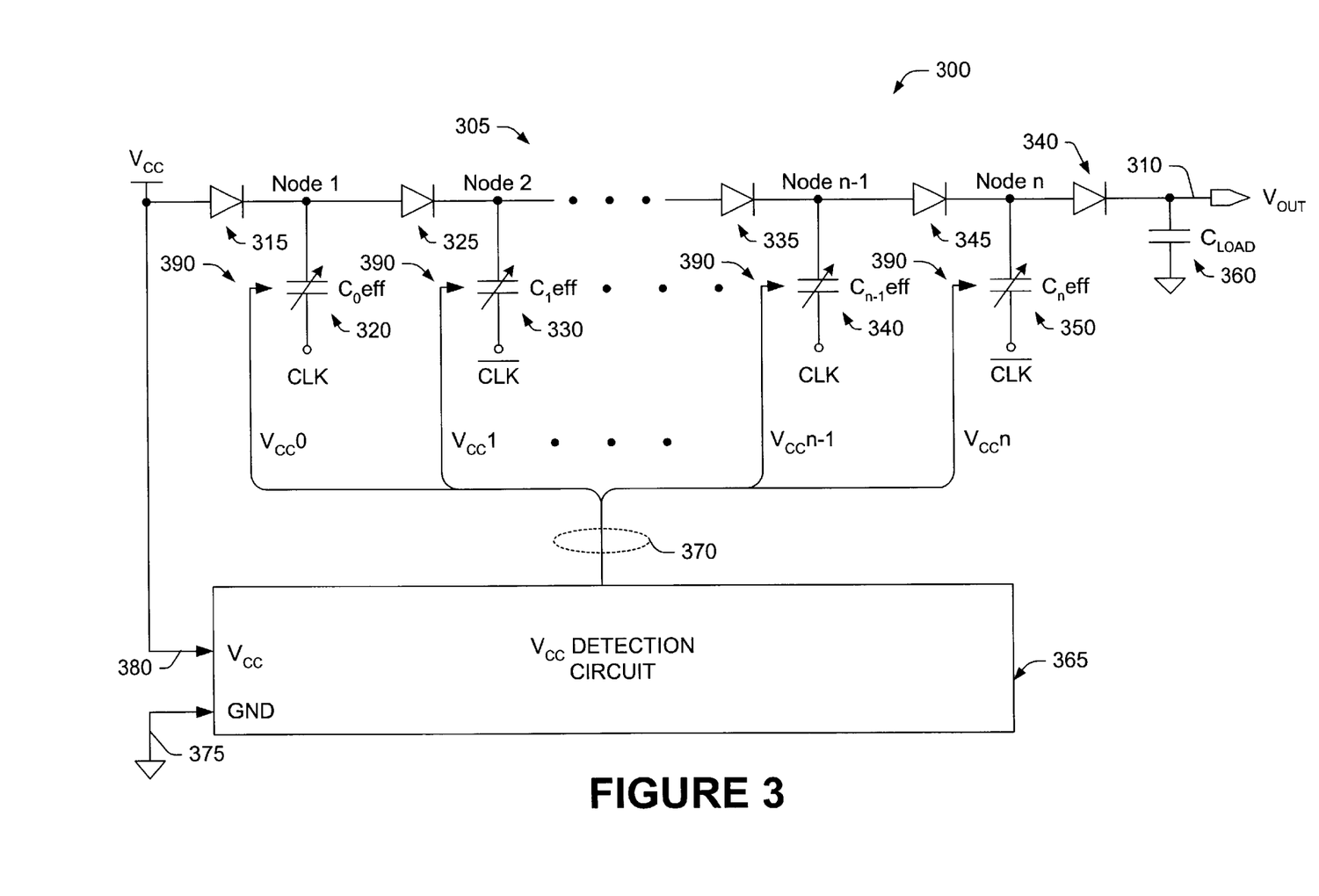
FIG. 3 is a simplified schematic illustration of an exemplary charge pump circuit for flash memory cell operations according to the present invention.

Referring now to the figures, FIG. 3 is a simplified schematic illustration of an exemplary system 300, according to the present invention, for generating a modulated charge pump voltage $V_{OUT}$ 310 for flash memory cell operations, comprising a supply voltage detection circuit 365 configured to detect a supply voltage value 380 and generate one or more output signals 370 associated therewith. The system 300 further includes a charge pump circuit 305 comprising one or more stages operable to receive the supply voltage 380 and generate the charge pump output voltage $V_{OUT}$ 310 having a value greater than the supply voltage 380, and a charge pump compensation circuit 390, operably coupled to the supply voltage detection circuit 365 and the charge pump circuit 305, and operable to receive the one or more output signals 370 from the supply voltage detection circuit 365 and modulate a capacitive loading (320, 330, 340, 350) associated with the charge pump circuit 305 based on the one or more supply voltage detection output signals 370. Such modulation produces a low power consumption charge pump, which generates a low ripple and low noise output $V_{OUT}$ 310 which compensates for fluctuations of the input power supply (for example, $V_{CC}$).

The exemplary charge pump 300 according to the present invention, has at its input, a power supply voltage (e.g., $V_{CC}$) 380 which is transmitted through a diode 315 to a first node (node 1) including a first bootstrap capacitor 320 having a modulated or variable effective capacitance value $C_0$eff which is a function of the input supply voltage. A second node (node 2) is connected to the first node (node 1) via a diode 325 and also has a second bootstrap capacitor 330 having a modulated or variable effective capacitance value $C_1$eff which is a function of the input supply voltage. The output of node 2 is then passed through a number of subsequent nodes, identical to previously described nodes 1 and 2, that may also include a bootstrap capacitor having a modulated or variable effective capacitance value which is a function of the input supply voltage. Finally, the exemplary charge pump 300 has an output terminal $V_{OUT}$ 310, also having a load capacitor 360 denoted $C_{LOAD}$ coupled thereto (representing a loading capacitance). $C_{LOAD}$ represents the total load capacitance present at the output of the charge pump $V_{OUT}$ and may comprise, for example, the capacitance associated with a word line. Additionally, one or more of the bootstrap capacitance values may be modulated or varied to an effective capacitance value which is a function of the input supply voltage.

The input power supply voltage 380 is also applied to a supply voltage detection circuit 365 configured to detect a supply voltage value and generate one or more output signals 370 associated therewith to the charge pump compensation circuit 390 which is operable to receive an oscillator input OSC, and generate the non-overlapping clock phase signals CLK and CLK NOT, which oscillate from 0 to $V_{CC}$. The clock phase signals are applied to alternate stage nodes, and insure that each individual node of the charge pump is either charging a subsequent node or is being charged by a previous node.

In operation, the exemplary system 300 of the present invention, has n nodes, in which one or more of the nodes may operate in the same manner as all other nodes, and as described by the operation of node 1. The supply voltage is input thru diode 315 to node 1 wherein the effective capacitance $C_0$eff is charged to the input supply voltage $V_{CC}$ 380 less the diode 315 voltage drop $V_{DIODE}$, at a time when CLK is low (0 volts). Therefore, when CLK=0: $V_{NODE\ 1}=V_{CC}-V_{DIODE}$ (if a circuit is used to cancel the $V_T$ of the diode connected transistor, then $V_{DIODE}=0$)

As has been discussed, the actual value of the effective bootstrap capacitance $C_0$eff 320, is modulated to a value which is a function of the input supply voltage produced by the supply voltage detection signals 370 from the supply voltage detection circuit 365.

On the next half cycle of the oscillator (not shown), the clock phase signal CLK, applied to the effective bootstrap capacitor $C_0$eff 320, will alternate from 0 to, for example, $V_{CC}$, while the clock phase signal CLK NOT, applied to the effective bootstrap capacitor $C_1$eff 330, will alternate from $V_{CC}$ to 0 volts. The charge on $C_0$eff 320 is then added to the $V_{CC}$ voltage applied to the CLK terminal of the capacitor, to force a charge sharing between $C_0$eff 320 and $C_0$eff 330. At this time, the CLK NOT terminal of $C_1$eff 330 now has 0 volts applied to the CLK NOT terminal, causing the charge on $C_0$eff 320 to be pumped by the $V_{CC}$ on the CLK terminal, and shared through the diode 325 to node 2 and onto $C_1$eff 330.

The function of the diode 315 is now to block any reverse flow of charge back to the previous stage or to the power supply, insuring that the charge is shared with the succeeding stage bootstrap capacitor. Alternate clock phases are applied to alternate nodes, insuring that each individual node of the charge pump is either charging a subsequent node or is being charged by a previous node. As the clock phase signals alternate between 0 and $V_{CC}$ to the bootstrap capacitors, the previous capacitors' charge is shared with the succeeding capacitor and pumped from node to node in this way, increasing the voltage at each subsequent node, until the final stage is encountered and the charge on $C_n$eff 350 is pumped by the $V_{CC}$ on the CLK NOT terminal, and shared through the diode 340 with the load capacitor $C_{LOAD}$ 360, to produce a charge pump output voltage $V_{OUT}$ 310.

The system 300 therefore detects the input voltage value of the charge pump (e.g., $V_{CC}$) and varies the capacitance associated with one or more of the pump stages to generate a low ripple and low noise output voltage value which compensates for the changes in the input voltage, while consuming less power than conventional charge pump circuits. For example, if the detected input voltage is a low $V_{CC}$ supply voltage (e.g., about 2.6 volts), the charge pump compensation circuit 390 is operable to increase the capacitance associated with one or more stages of the charge pump. In addition, if the detection circuit 365 detects a high $V_{CC}$ supply voltage (e.g., about 3.5 volts), the charge pump compensation circuit 390 is operable to decrease the capacitance associated with one or more stages of the charge pump. Accordingly, the system 300 is operable to dynamically vary the pumping capacitance of the charge pump based on the detected input voltage to create a charge pump circuit which consumes less power, and produces less ripple and noise in the output voltage than in conventional charge pump circuits.

Figure 4:
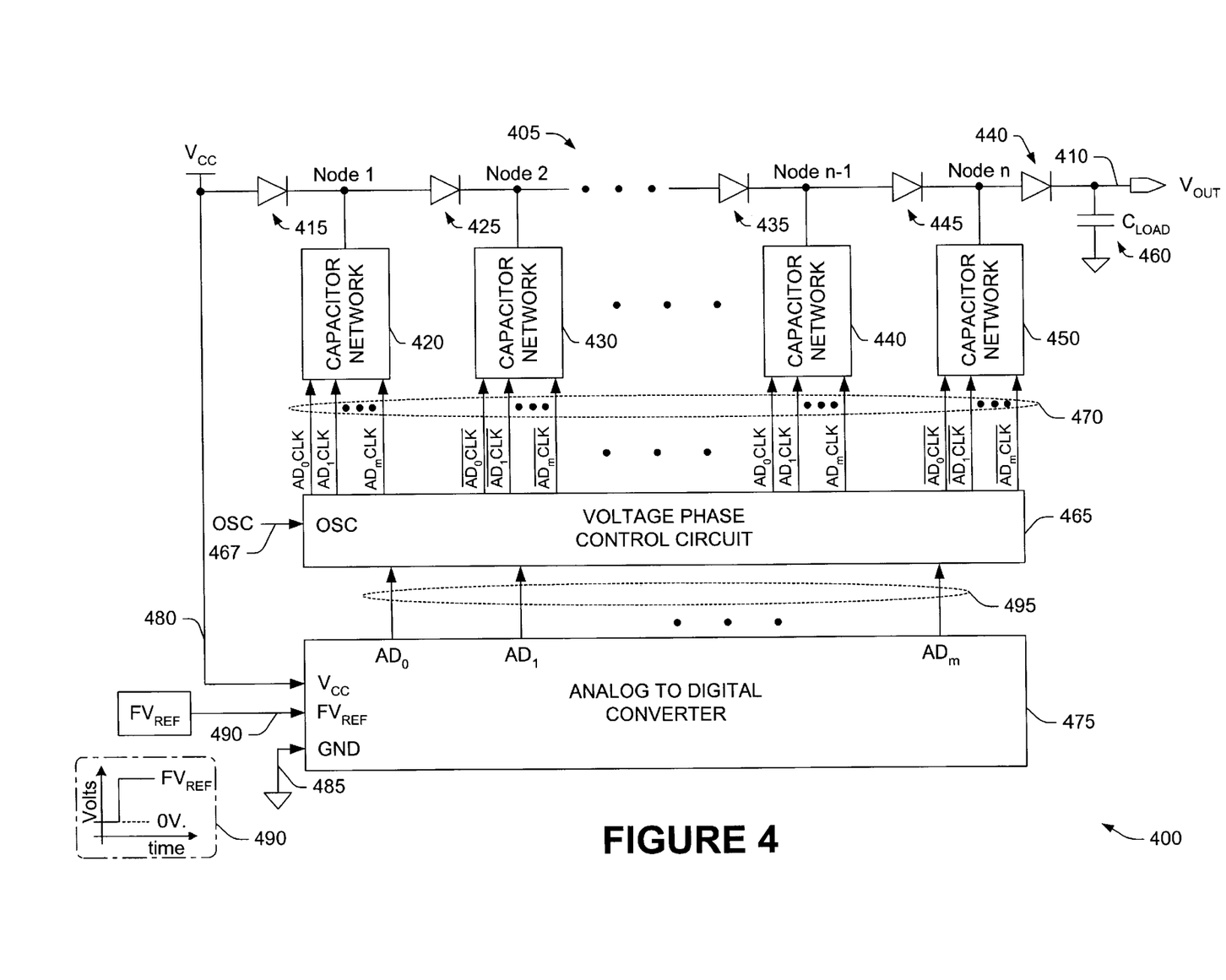
FIG. 4 is a system level functional block diagram illustrating an exemplary modulated charge pump system in which various aspects of the invention may be carried out.

FIG. 4 is a system level functional block diagram illustrating an exemplary modulated charge pump system 400 in which various aspects of the invention may be carried out. In accordance with the invention, a reference voltage (e.g., $FV_{REF}$ 490) is applied to, for example, an analog to digital converter (ADC) 475 with m bits of resolution. The ADC 475 measures the input supply voltage $V_{CC}$ 480 which is input to both the ADC 475 and to the charge pump 405. The ADC 475, for example, samples the input supply voltage 480 relative to GND 485, and produces m voltage level indications which provide supply voltage compensation signals 495 $AD_0$ thru $AD_m$, to a voltage phase control circuit 465.

The voltage phase control circuit 465 takes an oscillator signal OSC 467, and the supply voltage compensation signals 495 $AD_0$ thru $AD_m$, and generates one or more (e.g., n) sets of alternate phase capacitor network modulation signals 470, to a plurality of capacitor networks (420, 430, 440, 450). The capacitor networks, for example, contain a network of elements which exhibit capacitance (e.g., transistor junction, capacitors) which are varied by the capacitor network modulation signals 470, whereby they are modulated to an effective capacitance value which is a function of the detected input supply voltage 480.

In the actual system example 400, according to the present invention, the supply voltage compensation signals 495 are used to select which capacitors of a network (420, 430, 440, 450) are used based on the supply voltage 480, while the oscillator 467 generates the modulation of that selection via alternate clock phase signals 470 which are applied to alternate stages of the charge pump 405. Therefore, based on the capacitance selections within each capacitor network (420, 430, 440, 450), the effective total capacitance value of each capacitor network is determined by the input supply voltage 480, and results in a charge pump output voltage $V_{OUT}$ 410 which produces less ripple and noise, and consumes less power than in conventional charge pump circuits.

Figure 5:
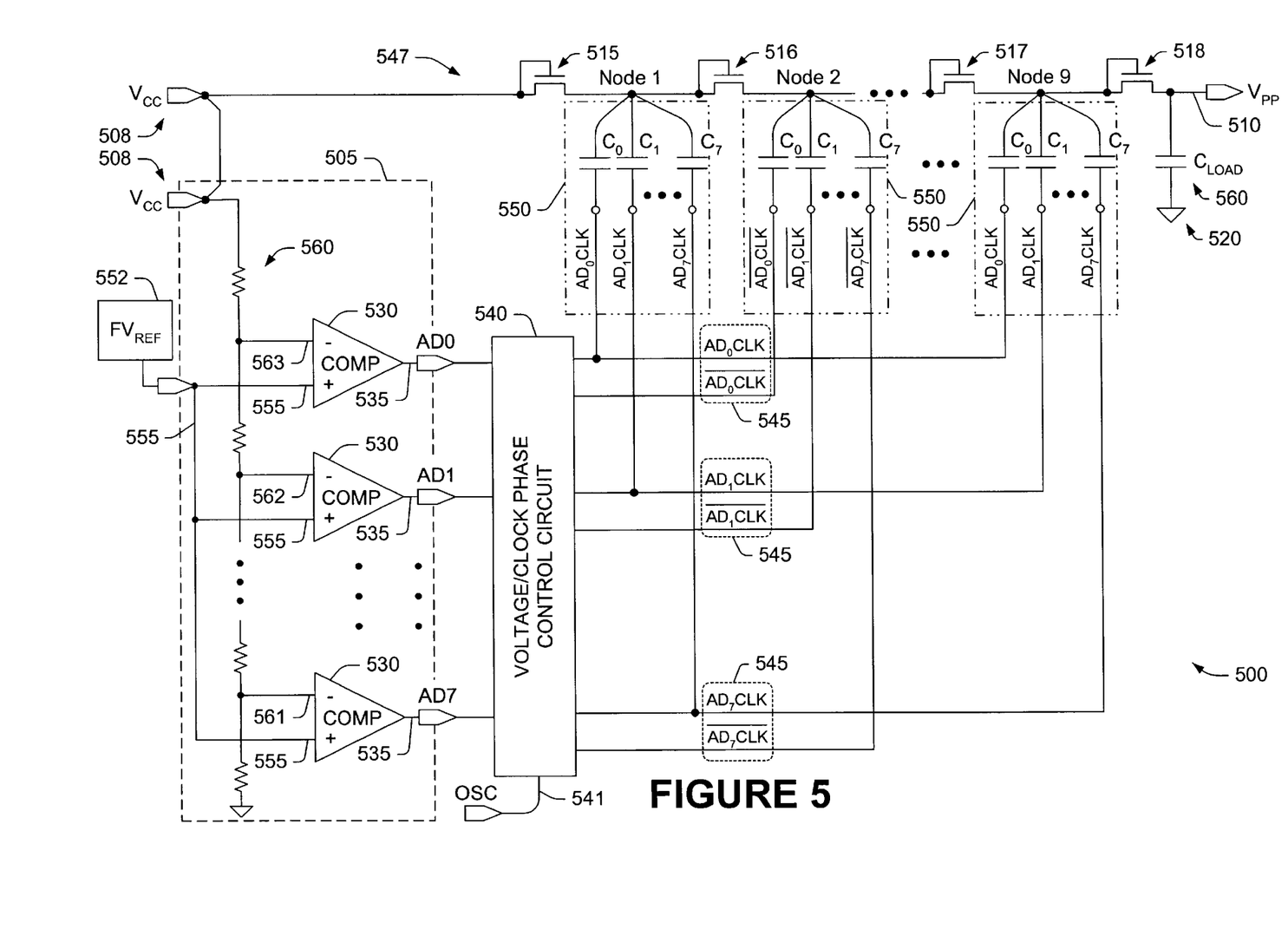
FIG. 5 is a simplified schematic illustration of an exemplary modulated charge pump system using an A/D circuit for supply voltage compensation, in accordance with an aspect of the invention.

FIG. 5 is a simplified schematic illustration of an exemplary modulated charge pump system 500 using an ADC type voltage detection circuit 505 for supply voltage 508 detection and subsequent compensation, in accordance with an aspect of the invention. In this specific exemplary implementation of the invention, an 8 bit analog to digital converter is used for supply voltage 508 detection relative to a reference voltage circuit 552 input $FV_{REF}$ 555. The ADC uses a resistor divider string 560 coupled to the applied supply voltage 508, to divide the applied voltage range and expected voltage variation into increments associated with the number of comparators 530 which are used (e.g., 8, 16). Each of these voltage divider increments generates a voltage value associated with to the applied supply voltage 508, and is compared to the reference voltage 555 using the 8 comparators 530. The comparators 530 produce supply voltage compensation signals at the comparator outputs 535, which are coupled to a voltage/clock phase control circuit 540 which uses the oscillator input OSC 541 to generate two clock phase output signals 545 for each bit of the ADC detection 535.

The two clock phase output signals 545, for example, are opposite clock phases of each ADC detection 535 which are used to modulate the capacitor selections of alternate stages of the charge pump 547. Each capacitor network 550 comprises a plurality of circuit elements which exhibit capacitance, and are selected by the alternate clock phase compensation signals 545 produced by a plurality of the ADC power supply voltage detections 535, resulting in an effective total capacitance value of each capacitor network which is determined by the input supply voltage 508, and results in a charge pump output voltage $V_{OUT}$ 510 which produces less ripple and noise than in conventional charge pump circuits, while consuming less power.

In one exemplary version 500 of the present invention, the supply voltage 508 is input to the charge pump 547 thru, for example, a series of diode connected transistors (515, 516, 517, and 518).

Although only diodes and diode connected transistors have been exemplified here in the charge pump, it should be obvious to anyone skilled in the art, that a switch, or any other similar device would be acceptable, which would provide isolation upon command from the supply input, along with a low impedance and low voltage drop when conducting charge between nodes and any such alternatives are contemplated as falling within the scope of the present invention.

The exemplary system 500 of FIG. 5 operates in the following manner. A plurality of different voltages (561, 562, and 563) which are a function of $V_{CC}$ are each input to a comparator circuit 530 that also receives the reference voltage $FV_{REF}$. Thus the outputs 535 of the comparators form a digital word (e.g., 00011111) that reflect the value of $V_{CC}$. This digital word serves as a $V_{CC}$ level determination and each bit of the word drives its own clock circuit 542 and a capacitor selection within the capacitor networks 550. Therefore, based on the digital word, a unique combination of capacitors are electrically placed in parallel within each capacitor network 550, thereby altering the effective values associated with $C_0$ thru $C_7$. Therefore, the detected value of $V_{CC}$ is employed as compensation to vary $C_0$eff thru $C_n$eff in order to conserve power, and to reduce the ripple and noise in the output voltage.

It is thus seen that appropriate voltages may be applied to the various terminals (e.g., source, drain, and gate) of the cells in the memory device in order to perform various operations (e.g., program, erase, verify) associated with the device. However, as stated above, the applied voltages have heretofore been derived from the source voltage to which the memory device is connected. Where such a supply voltage is not high enough to supply the voltages required to perform such operations, however, the device may be rendered inoperative or inapplicable in certain systems. This condition may result in low power applications of the memory device, for instance, in portable device applications wherein the supply voltage may be low. Alternatively, the memory cells in a memory device may comprise dual bit architectures requiring higher bitline and wordline voltages at the individual cells in order to properly perform various operations.

Thus, a charge pump circuit is needed to provide these increased voltages in conditions where the supply voltage is insufficient to allow proper memory operations. Also, as the input power supply voltage changes over time, temperature, or with the application of various loads, the charge pump output voltage of conventional charge pumps as applied to a regulator will reflect the $V_{CC}$ changes. It has also been shown that conventional charge pumps waste power supply charge and a resultant loss of pump efficiency by charging more capacitance than necessary for a given output voltage when $V_{CC}$ is high. Finally, a high input voltage applied to a conventional charge pump, produces an over-voltage in the output which causes the shunt regulator to produce a noisy output as the capacitors are discharged to ground. The present invention overcomes or minimizes these problems by providing a charge pump, and compensation for the $V_{CC}$ variations in the charge pump circuit, enabling a low power charge pump, which produces a low ripple and low noise output voltage, thereby providing more reliability in the memory operations where the charge pump is used.

In addition, the charge pump circuit of the present invention provides for a further reduction in power consumption when used in conjunction with a shunt regulator. Note that in prior art charge pump circuits, at high $V_{CC}$ input voltages, the charge pump output voltage would greatly exceed the desired target output voltage, which required the shunt regulator to shunt the excess wasted charge to ground. The charge pump circuit of the present invention reduces an amount of such shunting by the regulator, thereby reducing power. Further, since the charge pump output of the present invention exhibits a slower rise time due to its modulation, the shunt regulator advantageously provides a smaller ripple voltage at its regulation output.

Figure 6:
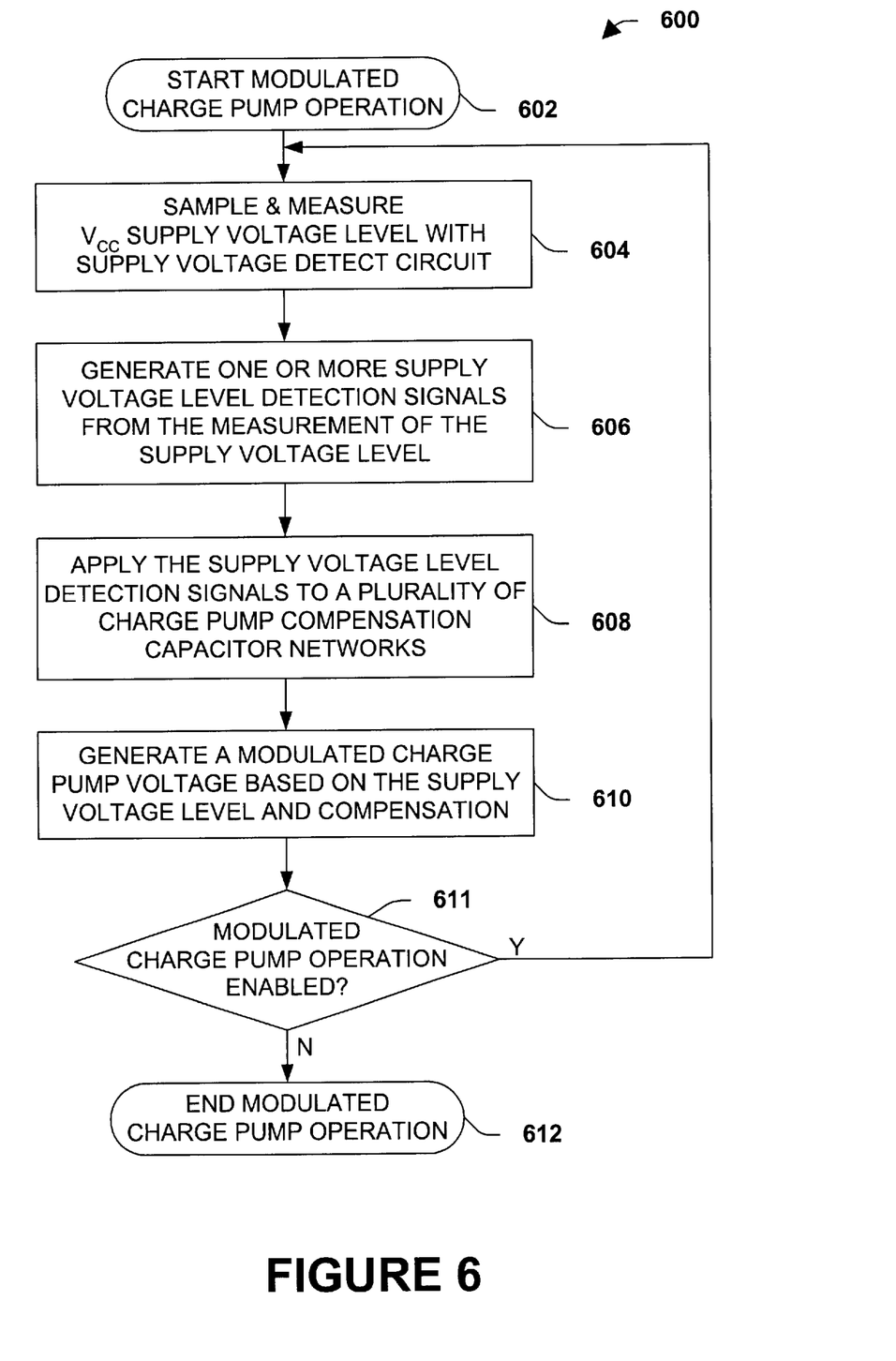
FIG. 6 is a flow diagram illustrating an exemplary method for a modulated charge pump operation in association with an aspect of the present invention.

Another aspect of the present invention provides a methodology for modulation of the charge pump operation in a memory device, which may be employed in association with the memory devices illustrated and described herein, as well as with other memory devices. Referring now to FIG. 6, an exemplary method 600 is illustrated for a modulated charge pump operation in a memory device. While the exemplary method 600 is illustrated and described herein as a series of acts or events, it will be appreciated that the present invention is not limited by the illustrated ordering of such acts or events, as some steps may occur in different orders and/or concurrently with other steps apart from that shown and described herein, in accordance with the invention. In addition, not all illustrated steps may be required to implement a methodology in accordance with the present invention. Moreover, it will be appreciated that the method 600 may be implemented in association with the apparatus and systems illustrated and described herein as well as in association with other systems not illustrated.

The method 600 comprises applying a supply voltage to a voltage level detection circuit, and determining the level difference relative to a target value set by a reference voltage, in order to control one or more capacitors used in a charge pump compensation circuit corresponding to the supply value, to conserve power, and to reduce the ripple and noise in the output of a charge pump circuit. The modulated charge pump operation method begins at step 602. At 604 the supply voltage (e.g., $V_{CC}$) is sampled and measured with a supply voltage detection circuit, (e.g., analog to digital converter, digital thermometer). At 606, the supply voltage level detection circuit generates one or more supply voltage level detection signals (e.g., 370 associated in FIG. 3 with $V_{CC}$ detector 365), in response to the $\Delta V_{CC}$ compared to a target value set by the reference voltage. The supply voltage level detection signals are then applied to a charge pump voltage compensation circuit (e.g., 390 associated in FIG. 3 with capacitor networks 320, 330, 340, 350) at 608. Thereafter a modulated charge pump output voltage $V_{OUT}$ resulting from the applied compensation is produced at step 610 in order to provide a stable, low power charge pump voltage in various memory operations. At step 611, a determination may be made whether the modulated charge pump operation is still enabled. If the operation is still enabled, the charge pumping and modulation operation continues at 604, otherwise the modulated charge pump operation thereafter ends at 612, and the method 600 may be repeated for subsequent charge pump operations of the memory device.

The methodology 600 thus provides for a stable, low power, lower noise elevated voltage in a charge pump circuit which detects the $V_{CC}$ value and uses such value to vary pumping capacitance network modulation circuitry to conserve power, and to reduce the ripple and noise in the output voltage which may be applied to core cells during various operations of flash memory arrays. Other variants of methodologies may be provided in accordance with the present invention, whereby compensation or modulation of a charge pump is accomplished.

Although the invention has been shown and described with respect to one or more implementations, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features Of the other implementations as may be desired and advantageous for any given or particular application. Furthermore, to the extent that the term "includes" is used in either the detailed description and the claims, such term is intended to be inclusive in a manner similar to the term "comprising."

What is claimed is:

1. A system for generating a modulated charge pump voltage for flash memory operations, comprising:
   a supply voltage detection circuit configured to detect a supply voltage and generate one or more output signals associated therewith;
   a charge pump circuit comprising one or more stages operable to receive the supply voltage and generate a charge pump output voltage having a value greater than the supply voltage; and
   a charge pump compensation circuit operably coupled to the supply voltage detection circuit and the charge pump circuit, and operable to receive the one or more output signals from the supply voltage detection circuit and modulate a capacitive loading associated with the charge pump circuit based on the one or more output signals, thereby creating an energy efficient charge pump which compensates for fluctuations of the supply voltage to produce a low ripple and low noise output.

2. The system of claim 1, wherein the supply voltage detection circuit comprises an analog-to-digital converter operable to receive the supply voltage as an analog input and generate a multi-bit word reflecting the supply voltage.

3. The system of claim 1, wherein the supply voltage detection circuit comprises a level detector circuit operable to compare the supply voltage to a plurality of predetermined voltages and generate the one or more output signals based on the comparison.

4. The system of claim 1, wherein the supply voltage detection circuit comprises;
   voltage reference circuit; and
   a plurality of comparator circuits each having a first input coupled to the voltage reference circuit and a second input coupled to one of a plurality of voltages associated with the supply voltage, wherein an output of each of the comparator circuits form an output signal which collectively form a digital word which reflects the supply voltage.

5. The system of claim 1, wherein the charge pump circuit with one or more stages further comprises:
   a stage diode coupled between an input of the charge pump circuit and a first stage thereof, and a stage diode coupled between each of the successive stages, if any, and wherein an output terminal of each of the stage diodes comprises a node, wherein the capacitive loading of the charge pump circuit is associated with each of the one or more nodes, wherein the capacitive loading associated with at least one of the one or more nodes is variable based on one or more control signals from the charge pump compensation circuit.

6. The system of claim 5, wherein the charge pump compensation circuit comprises:

a plurality of compensation capacitor networks each having a first terminal coupled to a respective node of the charge pump circuit, and each having a second terminal which is selectively coupleable to a circuit ground potential or a voltage potential approximately equal to the supply voltage based on the one or more output signals from the supply voltage detection circuit, thereby causing one or more of the plurality of compensation capacitor networks to exhibit a capacitance which is a function of the one or more output signals, thereby adjusting the capacitive loading of the charge pump circuit based on the supply voltage.

7. The system of claim 5, wherein the charge pump compensation circuit comprises a selectively employable network of capacitors.

8. The system of claim 6, wherein the adjusting of the loading of the charge pump circuit alters an effective network capacitance loading for one or more stages.

9. The system of claim 1, wherein the supply voltage detection circuit further comprises a reference voltage circuit operable to provide a reference voltage for comparing one or more voltages associated with the supply voltage thereto, wherein the comparison of the reference voltage to the one or more voltages associated with the supply voltage results in the one or more output signals associated with the supply voltage.

10. A method of generating a charge pump voltage in a flash memory device which is substantially less dependent on variations in a supply voltage, comprising the step of:

detecting a value of the supply voltage which is an input to a charge pump circuit; and varying an effective network capacitance loading for one or more stages of the charge pump circuit used to generate a charge pump output voltage in response to the detected supply voltage value.

11. The method of claim 10, wherein detecting the supply voltage value comprises;

inputting the supply voltage value into an analog-to-digital converter; and generating a multi-bit digital word which is related to the supply voltage value.

12. The method of claim 10, wherein detecting the supply voltage value comprises:

generating a plurality of voltage values associated with the supply voltage value;

comparing each of the plurality of voltage values to a reference voltage value; and generating a digital output value associated with each of the comparisons, thereby generating a multi-bit digital word which reflects the supply voltage value.

13. The method of claim 10, wherein varying the loading condition comprises:

coupling a first terminal of a plurality of capacitors to a node associated with one or more stages of the charge pump circuit; and coupling a second terminal of one or more of the plurality of compensation capacitor networks to a plurality of associated supply voltage detection signals based on the detected supply voltage value, wherein the supply voltage detection control signals are operable to alter an effective capacitance of the plurality of capacitors based on the detected supply voltage value.

14. A method of generating a charge pump voltage in a flash memory device which is substantially less dependent on variations in a supply voltage, comprising the step of:

detecting a value of the supply voltage which is an input to a charge pump circuit; and varying an effective network capacitance loading for one or more stages of the charge pump circuit used to generate a charge pump output voltage in response to the detected supply voltage value, wherein the one or more stages of the charge pump circuit comprises a compensation capacitor network having a first terminal coupled to a node associated with the one or more stages of the charge pump circuit thereof and a second terminal of the one or more of the plurality of compensation capacitor networks to a plurality of associated supply voltage detection signals based on the detected supply voltage value, and wherein the charge pump circuit further comprises a load capacitor having a first terminal coupled to a circuit ground potential and a second terminal coupled to the output node, wherein varying the loading condition comprises:

coupling a first terminal of the plurality of compensation capacitor networks to a respective node associated with one or more stages of the charge pump circuit;

applying alternate clock phase signals to the one or more alternate stages of compensation capacitor networks of the charge pump;

coupling a second terminal of one or more of the plurality of compensation capacitor networks within each stage to the supply voltage level and coupling the second terminal of the rest of the compensation capacitor networks within each stage, to the circuit ground potential based on the detected supply voltage value, thereby altering an effective capacitance associated with the bootstrap capacitor within each stage based on the detected supply voltage value; and allowing the one or more stages of the charge pump to charge pump and charge share with the alternate stages of the charge pump, to generate a charge pump voltage in response to the detected supply voltage value.

* * * * *

UNITED STATES PATENT AND TRADEMARK OFFICE
CERTIFICATE OF CORRECTION

PATENT NO. : 6,424,570 B1
DATED : July 23, 2002
INVENTOR(S) : Binh Q. Le and Pau-Ling Chen It is certified that error appears in the above-identified patent and that said Letters Patent is hereby corrected as shown below:

<u>Title page, Item [54] and Column 1, line 1,</u>
Title, please replace the word "WITH" with -- WHICH --.

Item [57], ABSTRACT,
Line 19, please replace the word "slow" with the word -- low --

<u>Column 8,</u>
Line 16, please replace the second formula "$C_0 eff\ 330$" with -- $C_1 eff\ 330$ --.

<u>Column 9,</u>
Line 41, please delete the word "to".

<u>Column 12,</u>
Line 50, please add the word -- a -- before the word "voltage".

Signed and Sealed this

Third Day of December, 2002

JAMES E. ROGAN
*Director of the United States Patent and Trademark Office*